United States Patent [19]

Hertzler

[11] Patent Number: 4,566,848
[45] Date of Patent: Jan. 28, 1986

[54] DEVICE FOR POSITIONING AND ORIENTING KINESCOPES

[75] Inventor: Merle E. Hertzler, Berks County, Pa.

[73] Assignee: RCA Corporation, Princeton, N.J.

[21] Appl. No.: 636,257

[22] Filed: Jul. 31, 1984

[51] Int. Cl.$^4$ .............................................. B65G 11/00
[52] U.S. Cl. .................................................. 414/749
[58] Field of Search ............... 414/749, 751, 753, 589, 414/590, 222, 226, 783, 757, 754, 782, 774, 752; 269/908; 198/394, 384, 344; 29/786, 822, 823, 824; 445/66, 6, 45

[56] References Cited

U.S. PATENT DOCUMENTS

| | | | |
|---|---|---|---|
| 2,992,058 | 7/1961 | Mullan | 316/32 |
| 3,418,099 | 12/1968 | Carter et al. | 414/752 X |
| 3,806,108 | 4/1974 | Adachi et al. | 445/66 X |
| 4,018,342 | 4/1977 | Cuniberti et al. | 414/752 X |
| 4,183,427 | 1/1980 | Tomikawa | 414/752 X |

FOREIGN PATENT DOCUMENTS

| | | | |
|---|---|---|---|
| 155442 | 12/1980 | Japan | 445/66 |
| 2021994 | 12/1979 | United Kingdom | 445/66 |

*Primary Examiner*—Robert J. Spar
*Assistant Examiner*—Dennis Williamson
*Attorney, Agent, or Firm*—E. M. Whitacre; D. H. Irlbeck; L. L. Hallacher

[57] ABSTRACT

A device for accurately positioning and orienting a kinescope at a preselected position includes a horizontally moveable but vertically fixed carriage which transports the envelope from a first loading position to a preselected position. A second carriage, which is vertically moveable and horizontally fixed, is centered at the preselected position. The second carriage normally is beneath the horizontally moveable carriage and is raised to lift the envelope from the horizontally moveable carriage. Neck centering members are coupled to the vertically moveable carriage and are boomerang shaped to include oppositely facing internally curved surfaces. The curved surfaces urge the neck of the envelope toward the preselected position irrespective of the tilt of the neck and assure that the neck is centered at the preselected position and that the longitudinal axis of the envelope is parallel to the vertical axis. Simultaneously rotatable bumpers are rotated to engage the sides of the envelope to assure that the horizontal and vertical axes of the envelope are parallel to the transverse and longitudinal axis of the device.

11 Claims, 4 Drawing Figures

DEVICE FOR POSITIONING AND ORIENTING KINESCOPES

BACKGROUND OF THE INVENTION

This invention relates generally to transfer mechanisms and particularly to a device for accurately positioning and orienting substantially rectangular envelopes, such as kinescopes, at a preselected position.

In an effort to improve quality and productivity while simultaneously decreasing costs, there is substantial activity directed toward automating the plants where kinescopes for color television receivers are manufactured. Frequently, the performance of the various manufacturing steps requires the kinescope envelopes to be accurately positioned at a preselected position and oriented in a desired orientation. The fulfillment of these positioning and orienting requirements enables automatic transfer devices to properly grasp the envelopes without the need for sensors on the transfer mechanisms. Examples of production steps which are presently being automated and require accurate positioning and specific orientation are the second getter flash and the automatic packaging of finished kinescopes.

It has been found that a second getter flash of kinescopes improves the performance of the tubes and frequently eliminates such problems as blocked apertures. Additionally, automatic packaging of the finished kinescopes eliminates expensive manual handling and substantially reduces damaging finished tubes. However, the automatic performance of these operations necessitates the kinescopes to be accurately positioned at a preselected position and oriented in a preselected orientation. When these conditions are met, the getter flash equipment can be moved into the vicinity of the getter and the automatic transfer mechanism is able to engage tubes of various sizes without the need for sensing the presence and orientation of the kinescopes.

The invention is directed to such a mechanism.

SUMMARY

A device for accurately positioning and orienting a substantially rectangular envelope at a preselected position includes a vertically fixed and horizontally moveable carriage for moving the envelopes from a first position and to a preselected position. A horizontally fixed and vertically moveable carriage is arranged at the preselected position, and removes the envelopes from the first carriage. Guide members are arranged on opposite sides of the horizontally moveable carriage and extend between the first position and the preselected position. A portion of the guide members converge toward the preselected position, and the guide members are vertically positioned to urge the neck of an envelope to a position substantially centered between the guide members. Neck centering members are moveably arranged on the vertically moveable carriage and configured to engage the neck of the envelope to center the neck at the preselected position and to vertically align the longitudinal axis of the neck. Envelope orienting means are arranged about the preselected position and engage the sides of the envelope to orient the envelope in a preselected orientation at the preselected position.

DETAILED DESCRIPTION

Figure 1:
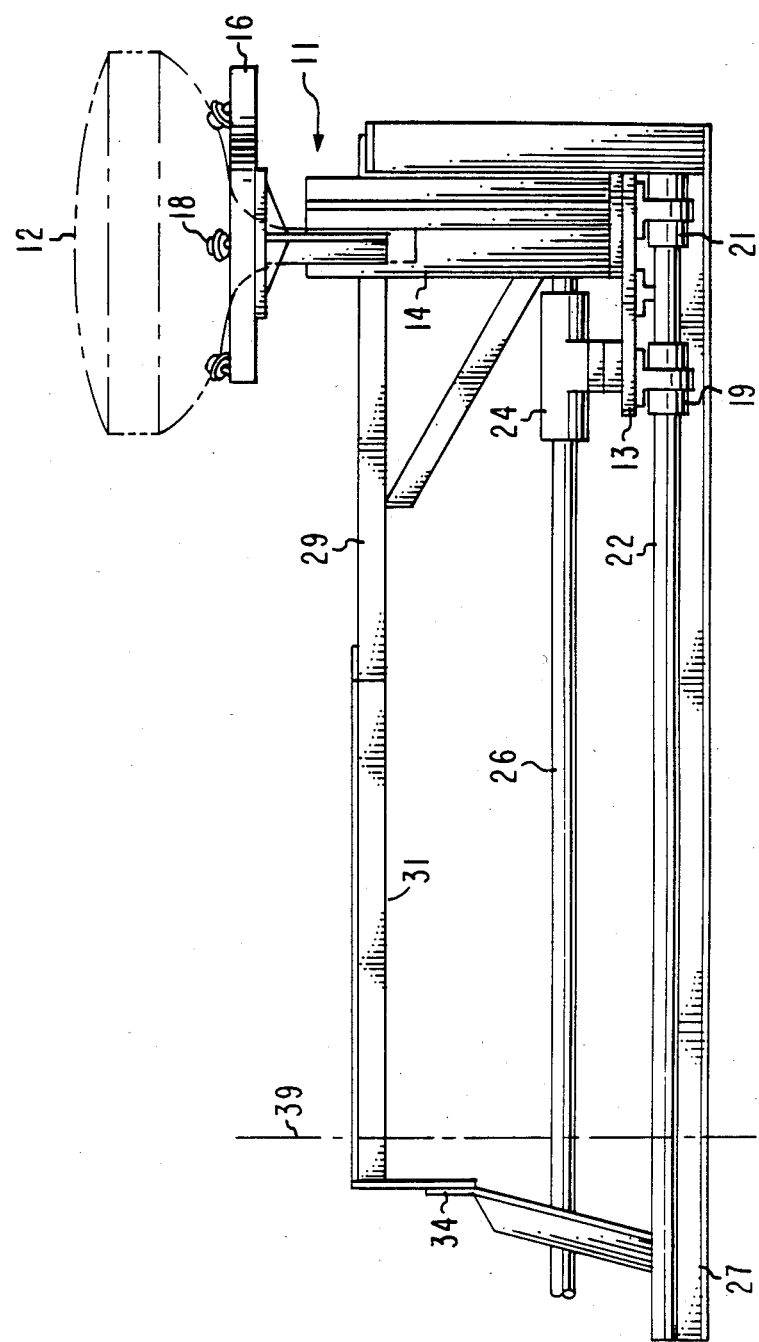
FIG. 1 is a side view of a horizontally moveable and vertically fixed carriage to move kinescope from a first position to a preselected position and the support structure for the carriage.
Figure 2:
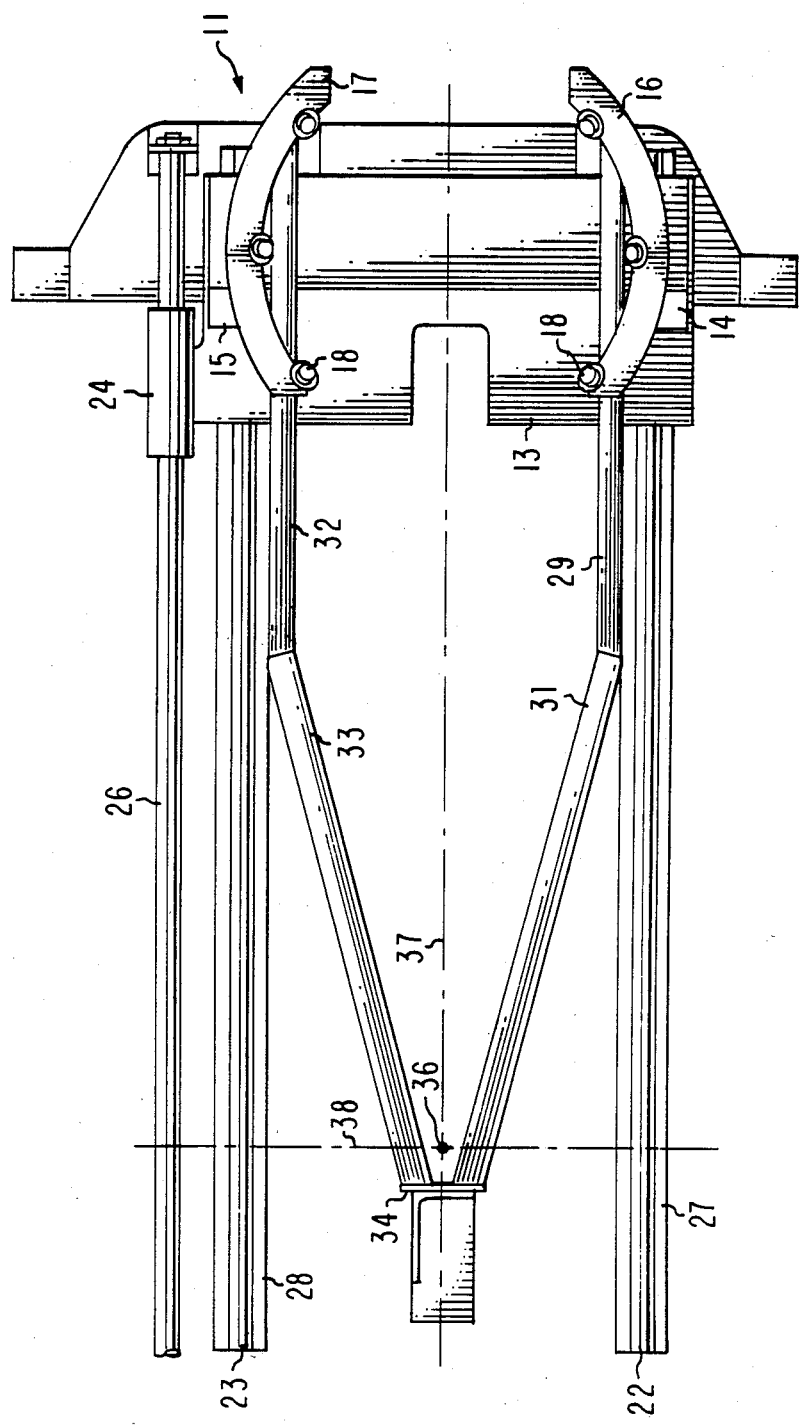
FIG. 2 is a top view of the mechanism shown in FIG. 1.

In FIGS. 1 and 2, a horizontally moveable and vertically fixed carriage 11 is positioned to receive an envelope 12 which, in the preferred embodiment, is a color television receiver kinescope, shown in phantom. The horizontally moveable carriage 11 is arranged at a convenient location to receive the kinescope 12 by either manual loading or automatic loading. The positioning of the kinescope on the carriage need not be accurate. Also, the orientation of the kinescope on the carriage 11 is not critical. However, the neck of the kinescope should point generally down and the getter within the envelope should face generally toward a preselected position to which the envelope will be transported. The carriage 11 includes a platform 13 to the ends of which are affixed two vertically extending members 14 and 15. The vertical members 14 and 15 respectively support substantially identical but oppositely facing arcuate members 16 and 17 each of which supports a plurality of kinescope supports 18. The supports 18 are made from a material which will not mar or damage a kinescope and the funnel section of the kinescope rests upon these supports. The supports 18 preferably are rollers encircled by a ring of bearings and thus freely rotate to minimize rubbing between the rollers and the envelope. Also, the heights of the rollers can be set in conformance with the curve of the envelope to assist in positioning in the envelope in the desired orientation. Two slide members 19 and 21 are fixed to the bottom of the platform 13 in the proximity of one edge of the platform. A smooth slide rod 22 passes through the slide members 19 and 21 and extends the full length of the support structure. Two slides (not shown), which are substantially identical to the slides 19 and 21, are fixed to the platform 13 in the proximity of the other edge. A rod 23 (FIG. 2) identical to the rod 22 passes through the additional slides. The rods 22, 23 and the slide members horizontally and vertically stabilize the carriage 11 while permitting easy horizontal motion of the carriage.

Horizontal motion of the carriage 11 is effected by use of a cylinder 24 which includes a shaft 26, both ends of which are fixed. The cylinder 24 can be actuated with air or hydraulically and the cylinder travels along the fixed shaft 26 in response to the activation fluid. The cylinder 24 is affixed to the platform 13 and, accordingly, motion of the cylinder 24 along the shaft 26 causes the slide members 19, 22, and the two not shown, to slide along the rods 22 and 23. A base member 27 is arranged beneath the rod 22 and a similar base member 28 is arranged beneath the rod 23. The base members 27 and 28 maintain the desired parallel relationship of the rods 22 and 23 and permanently support the carriage 11 and the arcuate members 16 and 17 at a predetermined height.

Guide members 29, 31, 32 and 33 are arranged at a fixed height above, and substantially parallel to, the rods 22 and 23. The height of the guide members 29 through 33 is selected so that the neck of a kinescope resting on the carriage 11 extends beneath the guide members irrespective of the tilt of the neck with respect to the vertical axis of the carriage 11. As shown in FIG. 2, the guide members 29 and 32 are substantially parallel to one another and to the slide rods 22 and 23. The guide members 31 and 32 converge so that the distal ends are closer than the proximal ends. A brace 34 supports the distal ends of the guide members 31 and 32 at the desired height above the rods 22 and 23 and at a spacing which is selected to be slightly larger than the diameter of the neck of any kinescope envelope which is placed upon the carriage 11.

In operation, a kinescope 12 is placed upon the supports 18 of the arcuate members 16 and 17 without regard to the orientation of the envelope other than assuring that the neck of the kinescope extends beneath the guide members 29, 31, 32 and 33 and that the getter of the kinescope generally faces the brace 34. The cylinder 24 is actuated to slide along the shaft 26 and pull the carriage 11 and the kinescope 12 toward the brace 34. The length of the shaft 26 determines the horizontal travel and the kinescope 12 is accurately positioned at a preselected location 36 which is defined by the juncture of a longitudinal axis 37, a transverse axis 38 (FIG. 2) and a vertical axis 39 (FIG. 1). Because of the rigid construction of the support structure and the limited travel of the cylinder 24, the carriage 11 is accurately centered at the preselected position 36 each time the cylinder 24 is actuated. However, the precise centering and orienting of the kinescope 12 at the preselected position 36 is not completed until the components described with respect to FIGS. 3 and 4 complete their operation. As the carriage 11 and the kinescope 12 move along the rods 22 and 23, any tilt of the kinescope neck which is in the general direction of the transverse axis 38 causes the neck to engage one of the converging guide members 31 or 33 and urge the neck toward the longitudinal axis 37. Because the spacing of the converging members 31 and 32 at the preselected position 36 is substantially equal to the known diameter of the kinescope neck, the neck is urged into rough alignment with the transverse axis 38 at the preselected position 36. Additionally, because the supports 18 freely rotate and are arranged to conform to the shape of the envelope, the motion along the rods 27 and 28 cause the envelope to tend to center itself in the carriage 11.

Several actions take place when the carriage 11 reaches the preselected position 36. First, the kinescope 12 is removed from the carriage 11. Second, the kinescope 12 is oriented so that the longitudinal axis through the neck of the kinescope is parallel to the vertical axis 39. Third, the vertical and horizontal axes of the kinescope 12 are aligned parallel to the longitudinal axis 37 and transverse axis 38, respectively. Additionally, after the kinescope 12 is removed from the carriage 11, the carriage is returned to the first position and is ready to receive another kinescope while the processing of the recently removed kinescope continues.

Figure 3:
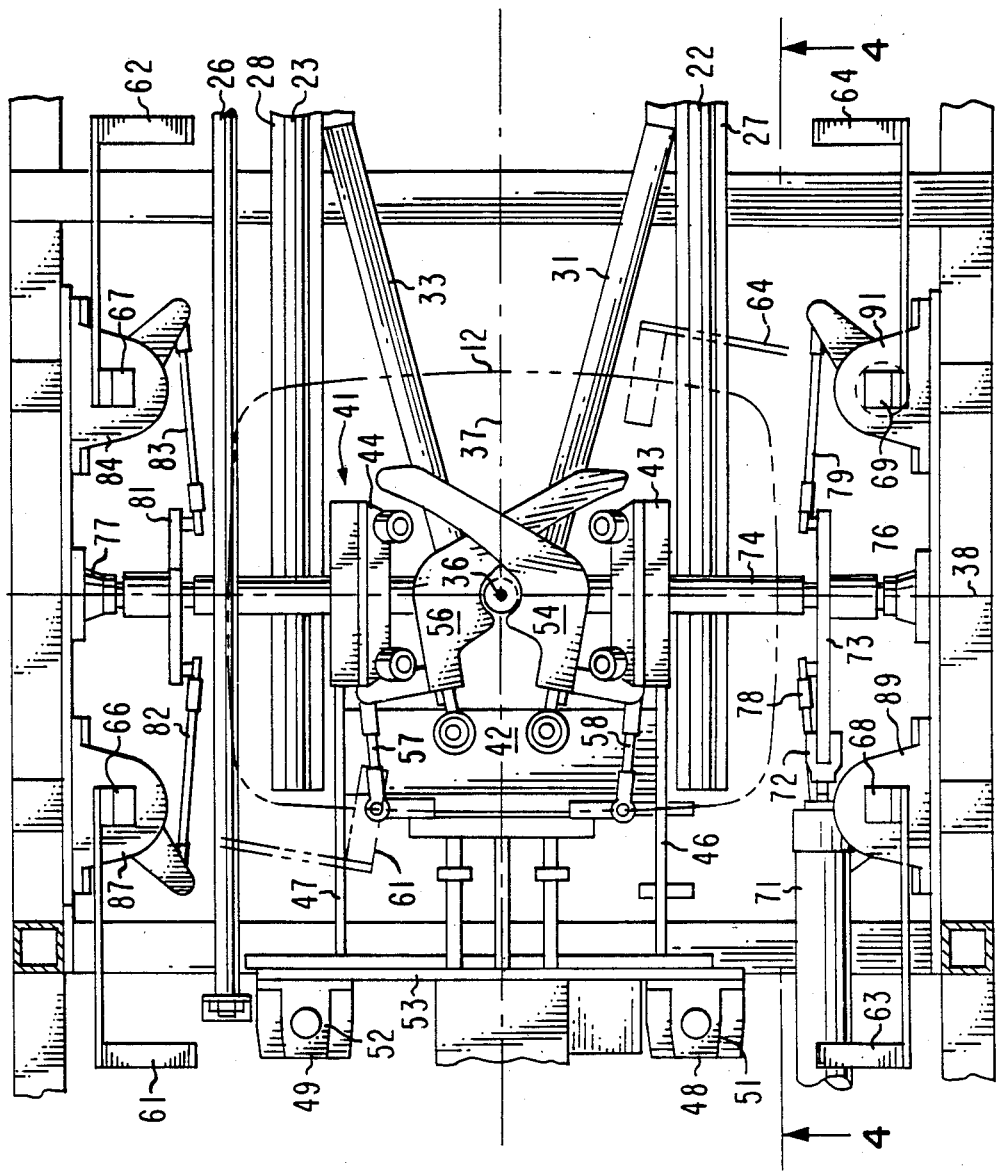
FIG. 3 is a side view of a vertically moveable and horizontally fixed carriage which is centered at the preselected location and the apparatus for precisely orienting a kinescope at such location.
Figure 4:
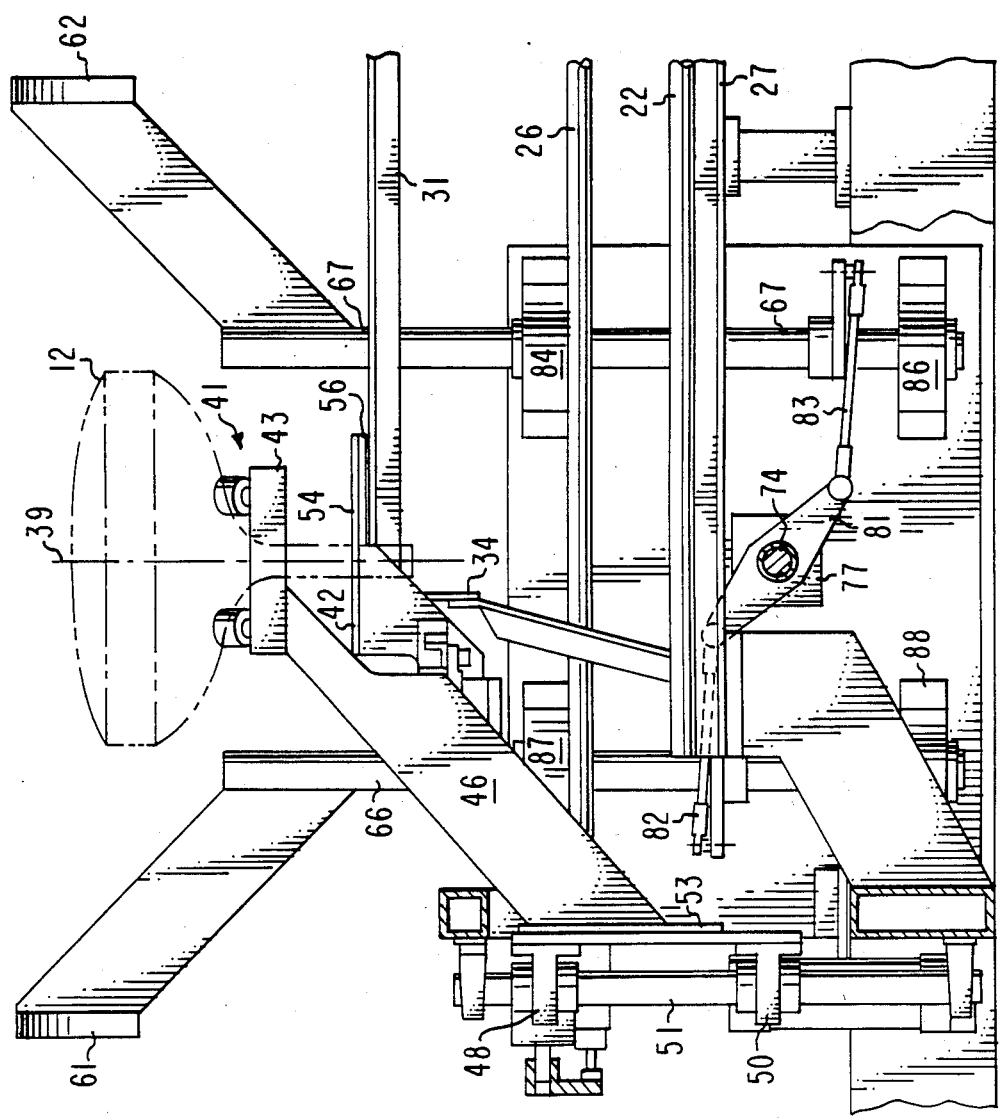
FIG. 4 is a top view of the mechanism shown in FIG. 3.

FIGS. 3 and 4 show the structure for accomplishing the above alignment actions. In FIGS. 3 and 4, simplicity of illustration, the preselected location 36 is shown after the carriage 11 has returned to the first position where kinescopes are loaded onto the apparatus. The removal of the kinescope 12 from the horizontally moveable carriage 11 is effected by use of a vertically moveable, horizontally fixed carriage 41. The center of the carriage 41 permanently coincides with the preselected position 36. When positioned at the lowest height, the carriage 41 is below the arcuate members 16 and 17 of the horizontally moveable carriage 11. Upon actuation, the vertically moveable carriage 41 rises above the arcuate sections 16 and 17 and lifts the kinescope 12 from the carriage 11. The vertically moveable carriage 41 includes a support platform 42 to which are affixed kinescope carriers 43 and 44. The carriers 43 and 44 are coupled by brace members 46 and 47 to two slides 48 and 49, respectively. The slides 48 and 49 slide on vertically arranged shafts 51 and 52. A brace 53 connects the slides 48 and 49 to assure simultaneous movement. A cylinder, or other mechanism (not shown), is used to raise the carriage 41 by causing the slides 48 and 49 to slide on their respective shafts 51 and 52. Additional slides, such as 50 in FIG. 3 are arranged on the shafts 51 and 52 to securely support the carriage 41 in the desired orientation.

Two oppositely facing boomerang shaped neck centering members 54 and 56 are pivotably coupled to the support platform 42. The facing inside surfaces of the neck centering members 54 and 56 are curved inwardly toward one another. The neck centering members are dimensioned to extend beyond the preselected position 36 and, therefore, the members engage the kinescope neck even when the neck is tilted at a large angle from the axis 39. One of the centering members is above the other so that they overlap when in the neck centering position. Accordingly, as the normally opened neck centering members 54 and 56 close the inside curved surfaces engage the neck of the kinescope on the carriage 41 and urge the neck toward the preselected position 36. The neck centering members 54 and 56 are configured to form an aperture centered at the preselected position 36. The aperture is dimensioned substantially identically to the diameter of the neck. Accordingly, when the elements 54 and 56 are closed, the neck of a kinescope is accurately centered at the preselected position 36 and the longitudinal axis of the kinescope is coincident with the vertical axis 39. Pivoting of the neck centering members 54 and 56 is effected by the use of the linkages 57 and 58 and a cylinder or other means, not shown.

Although the centering members 54 and 56 assure that the neck of the kinescope is precisely located at the preselected position 36 and that the longitudinal axis of the envelope is parallel to the vertical axis 39 these members do not assure that the horizontal and vertical axes of the kinescope faceplate are parallel to the transverse and longitudinal axis 38 and 37 of the positioning and orientating device. The alignment of these axes is assured by use of four bumper members 61, 62, 63 and 64 which respectively are mounted for rotation about the axes 66, 67, 68 and 69. The bumpers 61 to 64 are normally open as shown and are simultaneously rotated about the respective shafts 66 to 69 to engage the sides of the kinescope 12 and assure that the axes of the kinescope are parallel to the axes 37 and 38. The bumpers 61 and 64 are partially shown in the funnel urging position in phantom in FIG. 4.

Simultaneous rotation of the bumpers 61 to 64 is effected by use of a cylinder 71 the shaft 72 of which is coupled to one end of a lever 73. A shaft 74 is arranged parallel to the transverse axis 38 and is rotatably supported at the ends by bearings 76 and 77. The lever arm 73 is fixedly centered on the shaft 74. Accordingly, extension and retraction of the shaft 72 of the cylinder 71 rotates the lever arm 73 resulting in rotation of the shaft 74. One end of the lever arm 73 is coupled to the shaft 68 by a linkage 78. The other end of the lever arm 73 is coupled to the shaft 69 by a linkage 79. A similar lever arm 81 is centered on the other end of the shaft 74. One end of the lever arm 81 is coupled to the shaft 66 by a linkage 82 and the other end of the lever arm 81 is coupled to the shaft 69 by a linkage 83. In FIG. 3, the shaft 67 is shown to be supported by two bearings 84 and 86 to assure the permanent vertical orientation of the shaft. Similarly, the shaft 66 is vertically supported by two bearings 87 and 88. The shafts 68 and 69 also are supported by similar bearing arrangements, as shown by bearings 89 and 91 in FIG. 4. Actuation of the cylinder 71 extends the shaft 72 resulting rotation of the shaft 74 to simultaneously rotate the four bumpers 61 to 64 into engagement with the sides of the kinescope to align the vertical and horizontal axes of the kinescope with the longitudinal axis 37 and transverse axis 38 of the device, respectively. During this alignment, the kinescope rotates about the longitudinal axis through the neck and thus about the vertical axis 39.

After the bumpers 61 to 64 engage the sides of the kinescope, the kinescope is precisely positioned and orientated at the preselected position 36. The kinescope thus can be processed by automatic equipment because the position and orientation are known. Additionally, the kinescope can be picked up by an automatic transfer mechanism without the need for kinescope sensing devices.

I claim:

1. A device for accurately positioning and orienting a substantially rectangular envelope including a funnel having a neck portion at a preselected position comprising:
   a first carriage for receiving said envelopes, said first carriage being vertically fixed and horizontally moveable between a first position and said preselected position;
   a second carriage arranged at said preselected position, said second carriage being horizontally fixed and vertically moveable whereby said second carriage removes said envelopes from said first carriage at said preselected position;
   at least two guide members arranged on opposite sides of said first carriage and extending between said first position and said preselected position, at least a portion of said guide members converging toward said preselected position, said guide members being vertically positioned to urge the neck of an envelope carried by said first carriage to a position substantially centered between said guide members;
   neck centering members moveably arranged on said second carriage, said neck centering members being configured to engage the neck of said envelope to center said neck at said preselected position and to vertically align the longitudinal axis of said neck; and
   envelope orienting means arranged about said preselected position for engaging the sides of an envelope carried by one of said carriages to orient said envelope in a preselected orientation at said preselected position.

2. The device of claim 1 wherein said second carriage is initially below said first carriage and moves to a position above said first carriage.

3. The device of claim 2 wherein the spacing of said guide members at said preselected position slightly exceeds the diameter of the neck of said envelope.

4. The device of claim 3 wherein said neck centering members are pivotably coupled to said second carriage on opposite sides of said preselected position.

5. The device of claim 4 wherein said neck centering members are boomerang shaped and face in opposite directions whereby the inside surfaces of said centering members slide along the neck of an envelope and urge said neck into said preselected position.

6. The device of claim 5 wherein said envelope orienting members are pivotably arranged about said preselected position whereby said orienting members pivot into engagement with sides of said envelope and urge said envelope into said preselected orientation.

7. The device of claim 6 wherein said first carriage slides along guide rods between said fist position and said preselected position.

8. The device of claim 1 wherein said neck centering members are pivotably coupled to said second carriage on opposite sides of said preselected position.

9. The device of claim 8 wherein said neck centering members are boomerang shaped and face in opposite directions whereby the inside surfaces of said centering members slide along the neck of an envelope and urge said neck into said preselected position.

10. The device of claim 9 wherein said second carriage is initially below said first carriage and moves to a position above said first carriage.

11. The device of claim 10 wherein said envelope orienting members are pivotably arranged about said preselected position whereby said orienting members pivot into engagement with sides of said envelope and urge said envelope into said preselected orientation.

* * * * *